United States Patent
Tate

(10) Patent No.: US 8,185,441 B2
(45) Date of Patent: *May 22, 2012

(54) METHOD OF AUCTIONING LICENSE PLATES TO GENERATE REVENUE

(76) Inventor: Charles G. Tate, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,048

(22) Filed: Jul. 12, 2011

(65) Prior Publication Data

US 2011/0270656 A1 Nov. 3, 2011

Related U.S. Application Data

(63) Continuation of application No. 12/659,939, filed on Mar. 25, 2010, now Pat. No. 8,001,009.

(60) Provisional application No. 61/213,131, filed on May 8, 2009.

(51) Int. Cl.
*G06Q 30/00* (2012.01)
(52) U.S. Cl. ............................................ 705/26; 705/27
(58) Field of Classification Search .................... 705/26, 705/27
See application file for complete search history.

(56) References Cited

U.S. PATENT DOCUMENTS

| | | | |
|---|---|---|---|
| 5,623,403 A * | 4/1997 | Highbloom ..................... 705/28 |
| 6,058,417 A | 5/2000 | Hess et al. | |
| 6,076,064 A | 6/2000 | Rose, Jr. | |
| 6,324,778 B1 | 12/2001 | Gall et al. | |
| 6,466,917 B1 | 10/2002 | Goyal et al. | |
| 6,622,131 B1 | 9/2003 | Brown et al. | |
| 7,007,076 B1 | 2/2006 | Hess et al. | |
| 7,162,446 B1 | 1/2007 | Handler | |
| 7,346,553 B2 * | 3/2008 | Barnett ........................ 705/26.3 |
| 2005/0087604 A1 | 4/2005 | Nguyen et al. | |
| 2005/0235531 A1 | 10/2005 | Gall | |
| 2006/0107560 A1 | 5/2006 | Wong | |
| 2006/0283057 A1 | 12/2006 | Gall | |
| 2007/0175073 A1 | 8/2007 | Richard | |
| 2007/0198390 A1 | 8/2007 | Lazear et al. ................ 705/36 T |
| 2007/0255634 A1 | 11/2007 | Alley ................................ 705/35 |
| 2007/0289176 A1 | 12/2007 | Anderson | |

FOREIGN PATENT DOCUMENTS

| | | |
|---|---|---|
| CN | 101064011 A | 10/2007 |
| FR | 2776813 A1 | 10/1999 |

* cited by examiner

*Primary Examiner* — James Zurita
(74) *Attorney, Agent, or Firm* — Richard C. Litman

(57) ABSTRACT

The method of auctioning license plates provides for the public auctioning of state-issued, motor vehicle license plates. The method includes the step of first establishing a market value data set for a plurality of license plates. Next, the market value data set is stored in a market value database, which is recorded in computer readable memory associated with an auction server. An online auction is then established for at least one license plate to be sold. Once up for auction, bidders bid on the at least one license plate. Once bidding has closed, the at least one license plate is sold to the highest bidder, and funds are transferred from buyer to seller. Following the sale, transfer of ownership of the at least one license plate is recorded in a motor vehicle administration database, and both sales and property taxes associated with the sale of the license plate are assessed.

8 Claims, 6 Drawing Sheets

METHOD OF AUCTIONING LICENSE PLATES TO GENERATE REVENUE

CROSS-REFERENCE TO RELATED APPLICATION

This application is a continuation of Ser. No. 12/659,939, filed Mar. 25, 2010, now U.S. Pat. No. 8,001,009, which application claims the benefit of U.S. Provisional Patent Application Ser. No. 61/213,131, filed May 8, 2009.

BACKGROUND OF THE INVENTION

1. Field of the Invention

The present invention relates to auction methods, and particularly to a method of auctioning license plates that generates additional tax revenue for local and state governments, and which may be an online auction on a computer network. More particularly, the present method allows for an increase in revenue for both state and local governments through the levying of sales taxes on the sale or transfer of license plates, and through the establishment of property taxes on license plates based upon a market value set for a particular license plate. Further, the present invention relates to a method for the valuation of physical and material articles, namely license plates, through the usage of auctions, appraisal by local tax assessors or the like.

2. Description of the Related Art

A vehicle registration plate, commonly called a license plate, is a metal or plastic plate attached to a motor vehicle or trailer for official identification purposes. The registration identifier is a numeric or alphanumeric code that uniquely identifies the vehicle within the issuing region's database. In some countries, the identifier is unique within the entire country, while in others, it is unique within each state or province. Whether the identifier is associated with a vehicle or a person also varies by issuing agency. Depending on the jurisdiction of issue, the vehicle registration plate may be referred to as a license plate, number plate, or simply tag.

Most governments require a registration plate to be attached to both the front and rear of a vehicle, although certain jurisdictions or vehicle types, such as motorcycles, only require one plate, which is usually attached to the rear of the vehicle. National databases relate this number to other information describing the vehicle, such as the make, model, color, year of manufacture, engine size, type of fuel used and mileage recorded during the vehicles annual (or bi-annual) road worthiness test, Vehicle identification (Chassis) Number and the name and address of the vehicle's registered owner or keeper.

In some jurisdictions, these registration plates will be permanently assigned to that particular vehicle for its lifetime. Some countries permit the re-registration of the vehicle with "personal" (also known as "vanity" or "Cherished Mark") plates. When the vehicle is destroyed or exported to a different country it will require re-registering in the country of import. China, for example, requires the re-registration of any vehicle that crosses its borders from another country, such as overland holiday tourist visits, regardless of the amount of time it is due to remain there, and this has to be arranged with prior approval.

In others, such as U.S. states, where the term "license plate" is most commonly used, they may require periodic changing. For cost-saving purposes, however, the tendency for the past three decades has been to simply replace a small decal on the plate's surface, or to use a decal on the windshield to indicate the current expiration date of the registration. Additionally, some jurisdictions follow a "plate-to-owner" policy, meaning that when a vehicle is sold, the seller removes the current plate(s) from the vehicle. Buyers must either obtain new plates from their jurisdiction of residence or attach plates that they already hold from that jurisdiction, as well as formally registering their vehicles, under the buyer's name and the plate number, with the appropriate authorities. A person who sells a car and then purchases a new one can apply to have the old plates put onto this car. One who sells a car and does not buy a new one may, depending on the local laws involved, have to turn the old plates in or destroy them, or may simply be permitted to keep them. Other states keep the plate with the vehicle when ownership passes.

In the United States and Canada, license plates are issued by each state or provincial government. The federal government issues plates only for its own vehicle fleet and for vehicles owned by foreign diplomats. The appearance of plates is frequently chosen to contain symbols, colors, or slogans associated with the issuing jurisdiction.

The numbering system of license plates varies among the jurisdictions. Some states issue a motorist a serial that stays with that person as long as they live in that state, while other states periodically issue new serials and completely rotate out any old ones. Several states do not regularly use certain letters (most commonly, the letters I, O, and/or Q) in their plates, except on vanity plates, so as not to confuse observers with the numbers one and zero. When a person moves from one state or province to another, they are normally required to obtain new license plates issued by the new place of residence. Some U.S. states will even require a person to obtain new plates if they accept employment in that state, unless they can show that they return to another state to live on a regular basis. The most prominent exceptions to this policy are active duty military service members, who legally do not change residence when they move to a new posting. Federal law specifically allows them to choose to either retain the state vehicle registration of their original residence or change registration to their state of assignment.

In some countries, people can pay extra and obtain "vanity plates"; i.e., license plates with a custom number or character set. In the U.S., Canada and Australia, vehicle owners may also pay extra for specialty plates. With these plates, the sequence of letters and numbers is chosen by the licensing agency, as with regular plates, but the owners select a plate design that is different from the normal license plate. Fees for specialty plates are usually channeled to a specific charity or organization. For example, California has issued the "Yosemite plate" and "whale tail plate," both aimed at conservation efforts in the respective domains. Some jurisdictions allow for these special plates to also be vanity plates, usually for an additional fee on top of the cost of the plate.

When a vehicle is sold, the disposition of the license plates depends on state law and varies by state. In some states, license plates are transferred with the vehicle to its new owner. In other states, the license plates remain with the seller, who may, for a fee, transfer the license plates and any unused portion of the current registration to a new vehicle. Some states issue a new plate whenever the car is sold.

The various states have different schemes for reissuing license plates, a process known as "replating". In some jurisdictions, plates are issued on a permanent basis and are not replaced unless the owner requests a new plate or that his or her existing plate be remade. These jurisdictions include California, Delaware, Massachusetts, Oklahoma, and Oregon. Other jurisdictions replate on a rolling basis, replacing a particular motorist's plate when it reaches a certain age. Jurisdictions employing a rolling replate program include Arkansas (plates reissued every eight years), Florida (six years), Idaho (seven years), Texas (seven years), and Washington (seven years due to the five-year warranty on the reflective coating). Pennsylvania recently repealed its legislation which required a replate every ten years, just in time to avoid the replate which would have been mandated by law for 2009.

Yet other jurisdictions may recall a particular series of plates for reissuance at regular or irregular intervals. This is particularly common in jurisdictions in which only one license plate series or design is valid at any given time. Optional-issue plates may or may not follow the same rules for replacement as standard-issue plates, depending on the jurisdiction.

Delaware permits two things that have created a secondary market in license plates. First, the state issues license plates with one-digit, two-digit, three-digit, and four-digit numbers. The Governor of Delaware has license plate number of "1", the Lieutenant Governor has number "2", and the Secretary of State has number "3", but there are private owners who own some of the remaining single-digit tags. Second, owners are permitted to sell their licenses to other owners. Some of the low digit plates are made with white porcelain numbers, rather than the typical metal, thus making them more desirable in the marketplace.

Under Delaware law, passenger car plate numbers lower than 89000 can be made into a reproduction porcelain plate by the Delaware Historic Plate Company, which is the only firm that offers such reproductions. The law requires proof of registration of the number being reproduced. Commercial plates lower than C9999, dealer plates lower than D9999, and motorcycle plates lower than M/C9999 can also be reproduced.

The prestige of low-digit plates is such that three-digit plates can now bring $50,000 and two-digit plates can bring $200,000 in the market. Other jurisdictions also issue low-number license plates. For example, the District of Columbia reserves numbers 1 through 1250 for issuance at the discretion of the Mayor or City Council members.

It would be desirable to utilize the interest in the sale or transfer of desirable license plates in the open market to increase revenue for both the issuing state, and local jurisdictions. Thus, a method of auctioning license plates solving the aforementioned problems is desired.

SUMMARY OF THE INVENTION

The method of auctioning license plates provides for the public auctioning of state-issued, motor vehicle license plates, and for an increase in tax revenue on both the state and local levels based upon registration of license plates, the sale of license plates (i.e., via sales taxes), and the establishment of market values on license plates (thus allowing for property taxes to be assessed). The method of auctioning license plates includes the step of first establishing a market value data set for a plurality of license plates. Preferably, all license plates within a single state are assigned a market value, which is based upon rarity and desirability of the license plate design. Next, the market value data set is stored in a market value database, which is recorded in computer readable memory associated with an auction server. An online auction is then established for at least one license plate to be sold. Alternatively, a non-computerized, public auction may be held for the at least one license plate to be sold.

Next, an initial sale price for the at least one license plate to be sold is established, based upon at least one respective market value of the market value data set. Once up for auction, bidders bid on the at least one license plate, either via conventional online bidding or conventional, non-computerized auction bidding. Once bidding has closed, the at least one license plate is sold to the highest bidder, and funds are transferred from the highest bidder, or buyer, to the seller.

Following the sale and transfer of funds, the transfer of ownership of the at least one license plate is recorded in a motor vehicle administration database, including the appropriate identification and vehicle information associated with the transfer. In addition to transfer information, a sales tax associated with the sale of the license plate is calculated and recorded in a state sales tax database, to be paid by the buyer. Further, the license plate, having a market value, is considered taxable property, and a property tax for the license plate is calculated and recorded in a local property tax database, to be paid by the owner of the license plate. An additional arbitration step may be enacted by either buyer, seller or a third party associated with the system if necessary. Such arbitration may be further necessary with regard to assessment of value of a particular license plate.

Through the establishment of a market value for each license plate, both states and their local principalities gain a new source of revenue in the form of sales tax (from the sale of the license plates via auction) and property taxes (for the established property or market value of each license plate). It should be understood that, as a further alternative, valuation of the license plates may occur without the usage of an auction, but through appraisal by a local tax assessor or the like.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
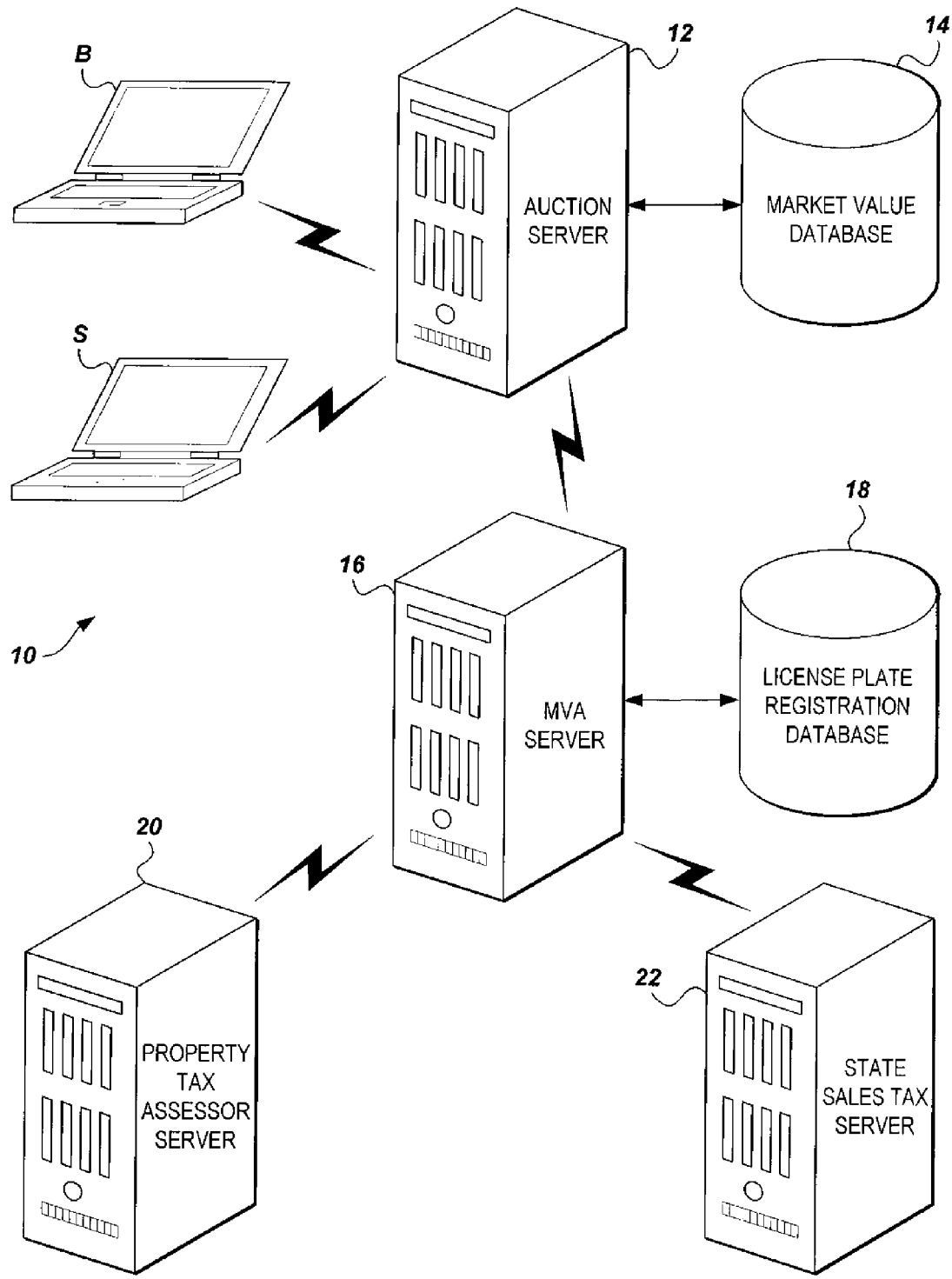
FIG. 1 is diagrammatic view of a system for implementing a method of auctioning license plates according to the present invention.

Referring to FIGS. 1-4B, there is shown a method for auctioning license plates and a system 10 for the implementation thereof. The method of auctioning license plates provides for the public auctioning of state-issued, motor vehicle license plates, and for an increase in tax revenue on both the state and local levels based upon registration of license plates, the sale of license plates (i.e., via sales taxes), and the establishment of market values on license plates (thus allowing for property taxes to be assessed). In overview, the method of auctioning license plates includes the steps of first establishing a market value data set for a plurality of license plates. Preferably, all license plates within a single state are assigned a market value, which is based upon rarity and desirability of the license plate design. As shown diagrammatically in FIGS. 1 and 2, the market value data set is stored in a market value database 14, which is recorded in computer readable memory 26 associated with an auction server 12. It should be understood that, as an alternative, valuation of the license plates may occur without the usage of an auction, but through appraisal by a local tax assessor or the like.

The market value associated with a license plate is dependent upon the particular number, order and arrangement of numerals and letters printed on the license plate. Table 1 illustrates an exemplary market value set:

TABLE 1

| License Plate Numbers/Letters | Current Market Value (CMV) in Whole Dollars | # of Plates in Sub-Range | # of Sub-Ranges | Total Tax Base In Whole Dollars |
| --- | --- | --- | --- | --- |
| 1-9 | $500,000 | 9 | 1 | $4,500,000 |
| 10-99 | 400,000 | 90 | 1 | 36,000,000 |
| 100-199 | 300,000 | 100 | 1 | 30,000,000 |
| 200-499 | 250,000 | 300 | 1 | 75,000,000 |
| 500-999 | 150,000 | 500 | 1 | 75,000,000 |
| 1,000-9,999 | 50,000 | 9,000 | 1 | 450,000,000 |
| 10,000-99,999 | 25,000 | 90,000 | 1 | 2,250,000,000 |
| Sub-Total ($) | | | | 2,920,500,000 |
| A-Z 1-9 | $50,000 | 9 | 26 | $11,700,000 |
| A-Z 10-99 | 15,000 | 90 | 26 | 35,100,000 |
| A-Z 100-199 | 5,000 | 900 | 26 | 117,000,000 |
| Sub-Total ($) | | | | 163,800,000 |
| AA-ZZ 1-9 | $5,000 | 9 | 676 | $30,420,000 |
| AA-ZZ 10-99 | 2,500 | 90 | 676 | 152,100,000 |
| AA-ZZ 100-999 | 1,000 | 900 | 676 | 608,400,000 |
| Sub-Total ($) | | | | 790,920,000 |
| Total ($) | | | | 3,875,220,000 |

It should be understood that the above figures in Table 1 are shown for exemplary purposes only. The lowest established market value for a license plate is set at $1,000. As will be described in detail below, property tax is assessed for license plates, thus the lowest property tax a motor vehicle owner can pay (as revenue for local government) is based on a property value of $1,000. This most common set of license plates, with 900 drivers having such plates in the example given above, includes a combination of a pair of letters, ranging from AA to ZZ, with a three-digit number, ranging from 100-199. The number of sub-ranges, or combinations, available is 676 for these 900 license plates. Less common plates within the 676 sub-ranges are double-letter plates but with double-digit numbers (for a market value of $2,500) or the rarer single-digit numbers (for a market value of $5,000).

As license plates become more rare, the market value for the license plates increases, as shown, resulting in the highest market value of $500,000 for a license plate having only a single digit printed thereon. Only 9 such license plates exist within this singular sub-range (excluding a license plate reading "0"). In the above, it should be understood that values have not been assigned for vanity plates, commercial plates, motorcycle plates or license plates having further combinations of letters and/or numerals. The set value for each combination and design is dependent upon the state issuing the license plates. For the 801,297 vehicles listed in the market value data set of Table 1, a total of $3,875,220,000 results from the taxable license plate base for the state and local governments to assess.

Figure 2:
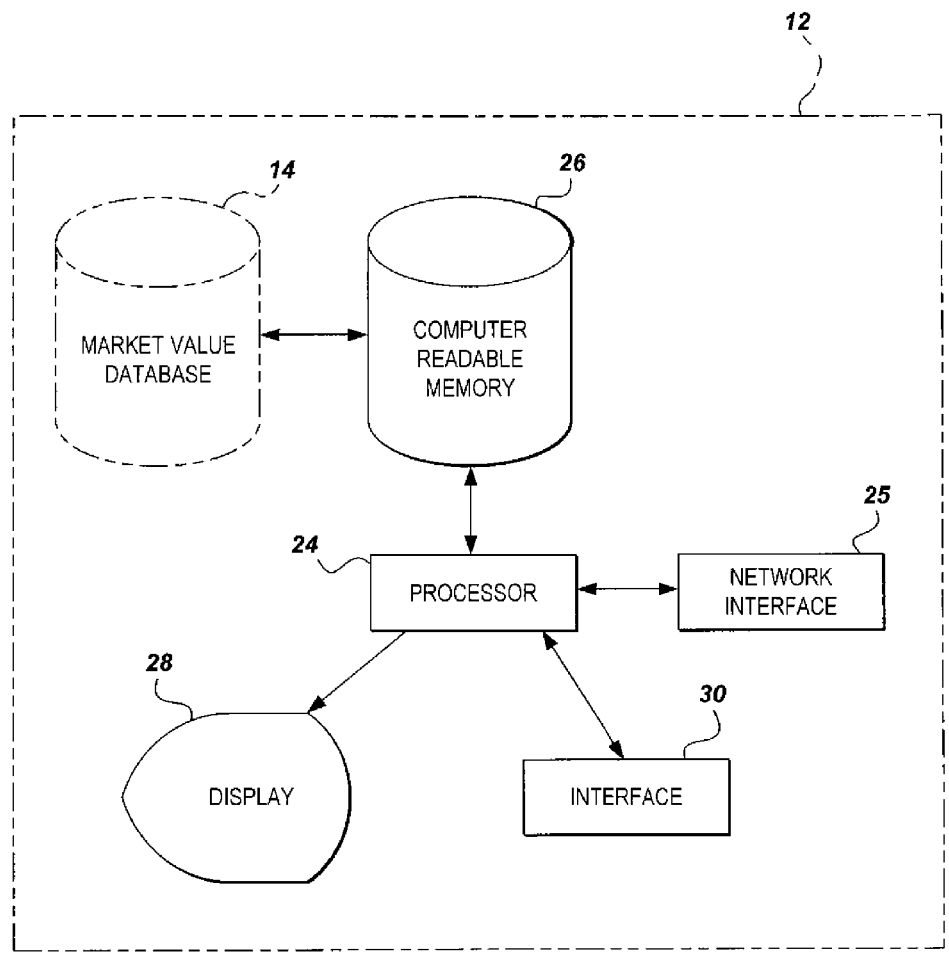
FIG. 2 is a block diagram of an auction server of the system for implementing the method of auctioning license plates according to the present invention.

The auction server 12, as shown in FIG. 2, may be any suitable type of computer server including a processor 24 in communication with computer readable memory 26, a network interface 25, a display 28 and a user interface 30. Any suitable type of processor may be utilized, and any suitable type of computer readable memory capable of storing the market value database 14 may be used. Further, network interface 30 may connect the server 12 to buyer terminals B and seller terminals S via any suitable type of networking interface, including an Internet connection or any other suitable type of wide area network (WAN) connection, or local area network (LAN) connection, such as an Ethernet interface, for example.

Once the market value dataset has been stored in the market value database 14, an online auction is established for at least one license plate to be sold. Alternatively, a non-computerized, public auction may be held for the at least one license plate to be sold. Next, an initial sale price for the at least one license plate to be sold is established, based upon at least one respective market value of the market value data set stored in database 14. Once up for auction, bidders bid on the at least one license plate, via connection of bidder terminals B to server 12 in an online auction, which utilizes conventional online bidding, as is well-known in the art, or via conventional, non-computerized auction bidding. Once bidding has closed, the at least one license plate is sold to the highest bidder, and funds are transferred from the highest bidder, or buyer, to the seller.

Following the sale and transfer of funds, the transfer of ownership of the at least one license plate is recorded in a motor vehicle administration registration database 18, including the appropriate driver and vehicle identification associated with the transfer. The motor vehicle administration registration database 18 is recorded in computer readable memory associated with a motor vehicle administration (MVA) server 16, which is connected via any suitable computer network with auction server 12. In addition to transfer information, a sales tax associated with the sale of the license plate is calculated and recorded in a state sales tax database recorded in memory of a state sales tax server 22, to be paid by the buyer. Further, the license plate, having a market value, is considered taxable property, and a property tax for the license plate is calculated and recorded in a local property tax database recorded in memory of a property tax assessor server 20, to be paid by the owner of the license plate. It should be understood that servers 16, 20, 22 may be any suitable types of servers, including at least the basic components described above with regard to auction server 12. During the process, an additional arbitration step may also be enacted by the buyer, seller or by a third party associated with the system, allowing for the settling of disputes regarding sale or value of a particular license plate or license plates. Such arbitration may be further necessary with regard to assessment of value of a particular license plate.

Figure 3A:
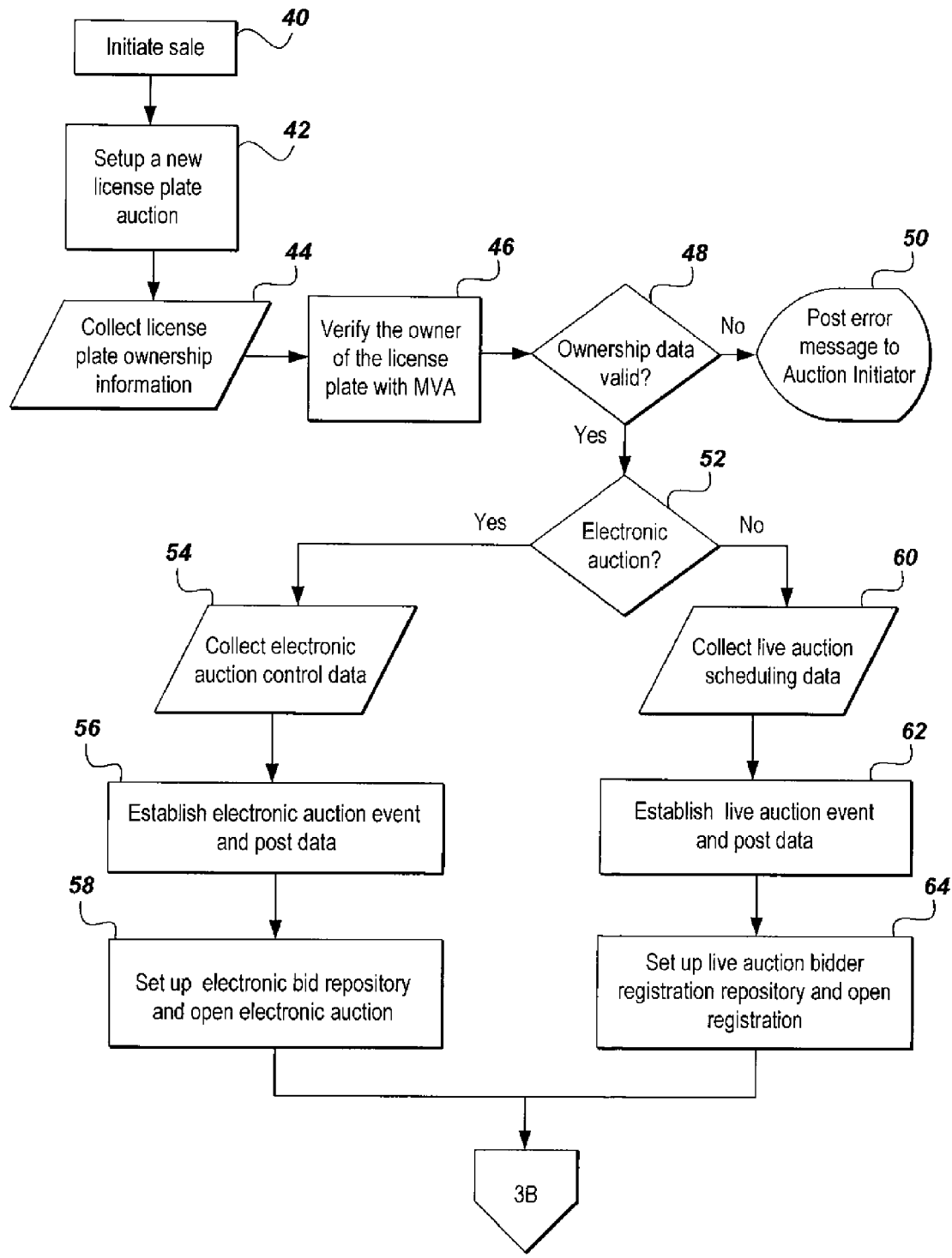
FIGS. 3A and 3B are a flowchart illustrating sale of a license plate utilizing the method of auctioning license plates according to the present invention.
Figure 3B:
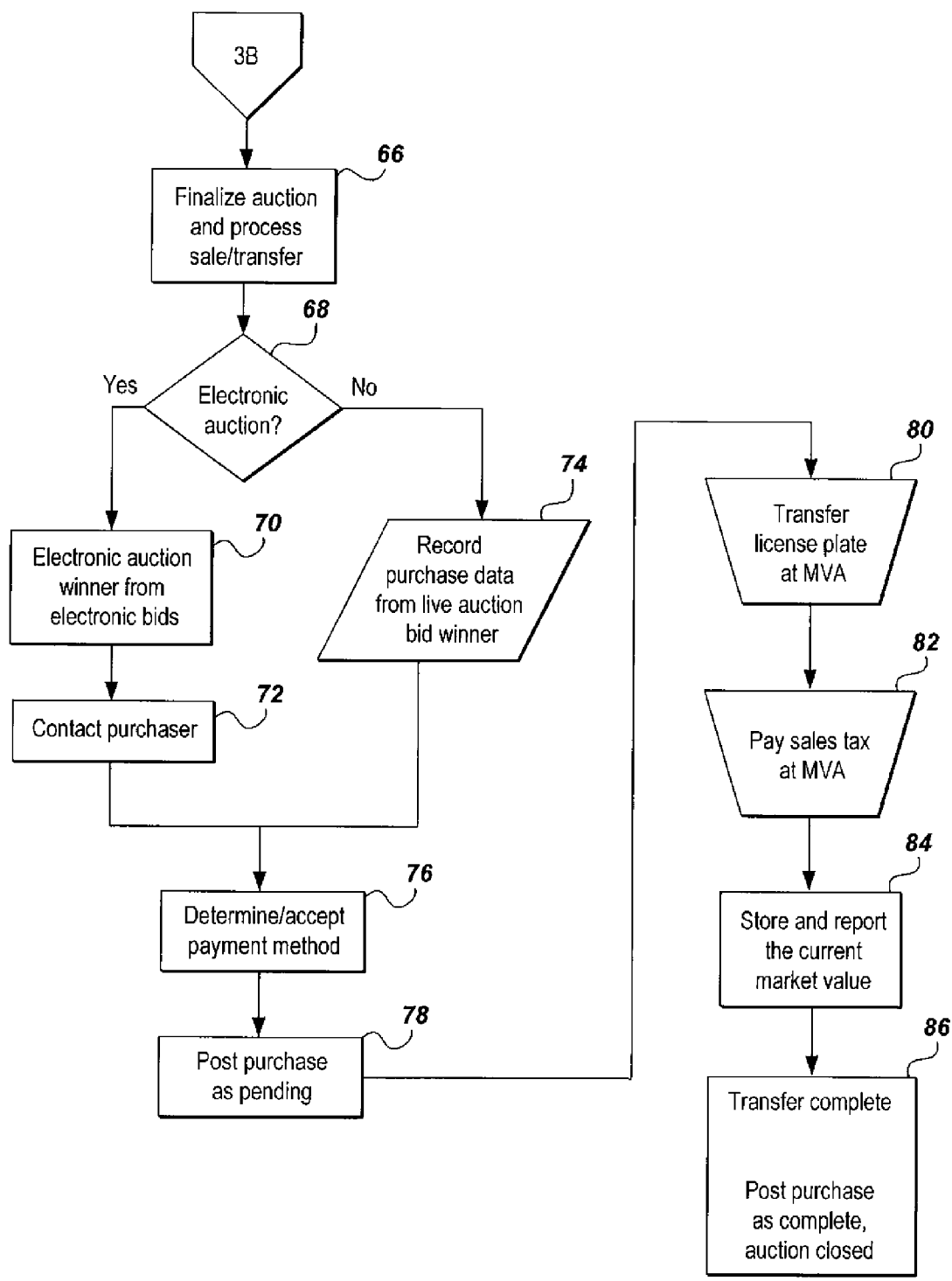
Figure 4A:
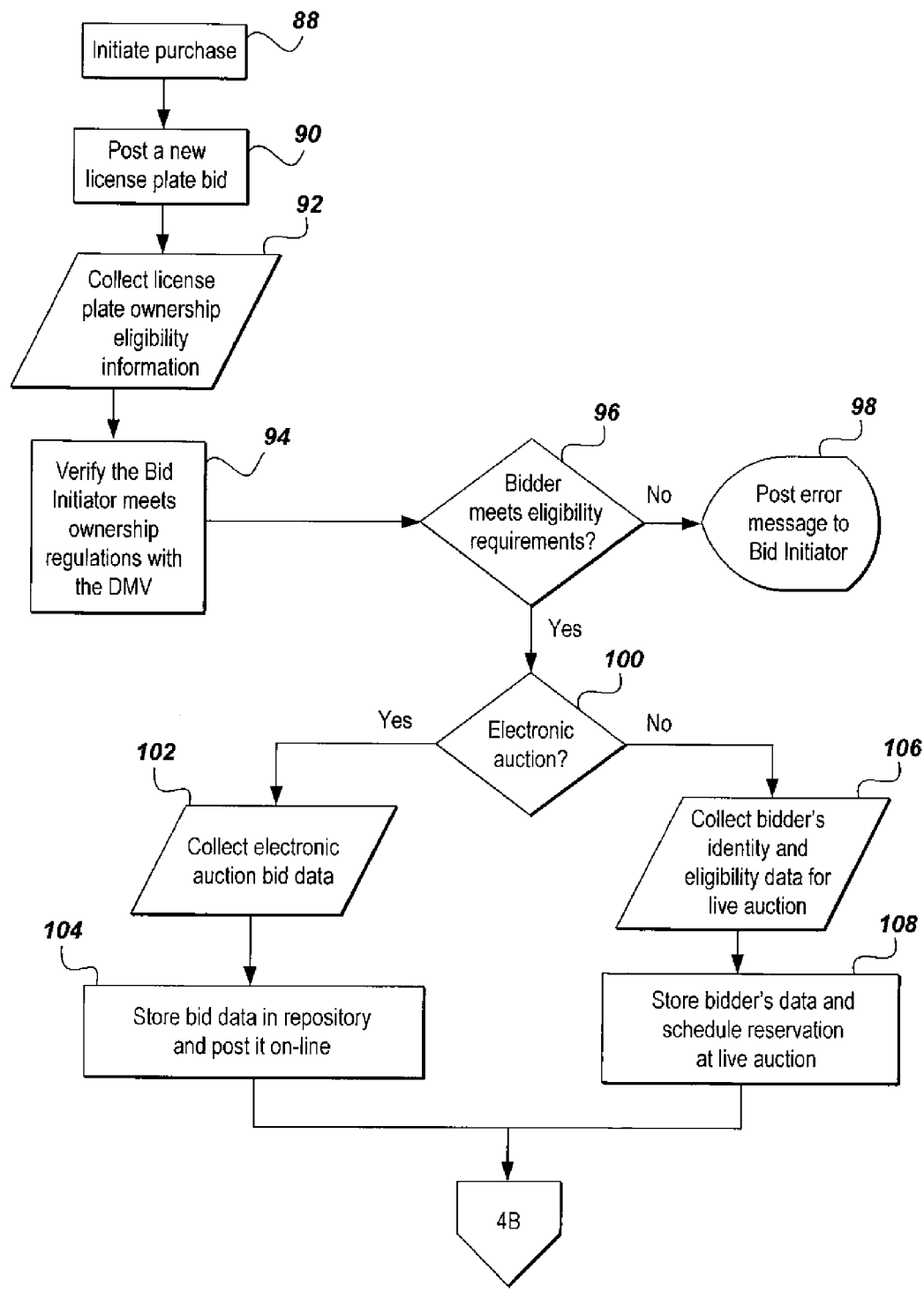
FIGS. 4A and 4B are a flowchart illustrating bidding on and purchase of a license plate utilizing the method of auctioning license plates according to the present invention.
Figure 4B:
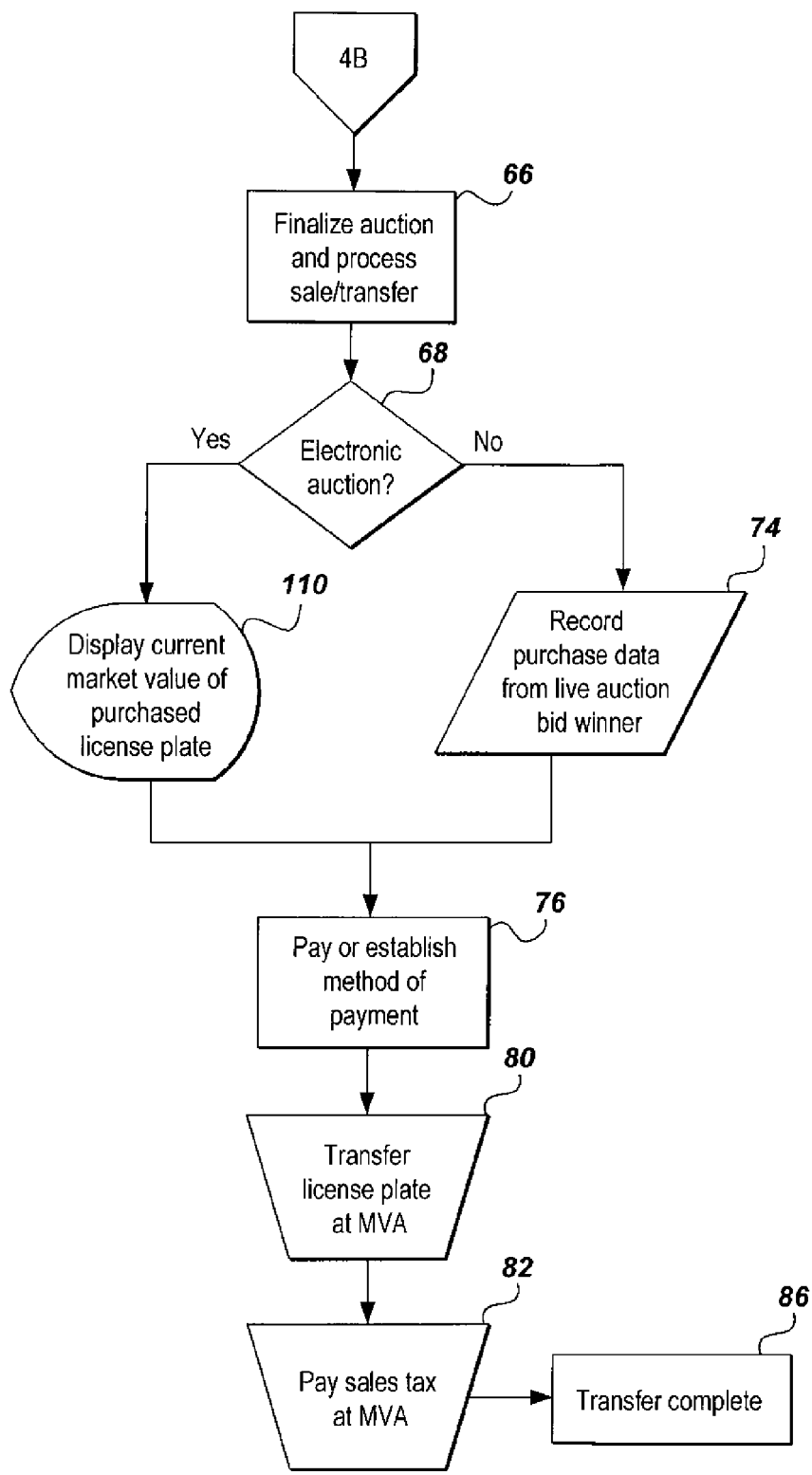

FIGS. 3A and 3B illustrate the method from the point of view of the seller of the license plate, and FIGS. 4A and 4B illustrate the method from the point of view from the buyer of the license plate. In FIG. 3A, the sale is initiated at step 40, which involves the setting up of the auction at step 42. Step 42 either encompasses establishing the auction on the auction server 12, to be conducted via computer network, or processing the auction for a live, non-computerized auction sale. At step 46, the MVA is contacted to verify ownership of the license plate to be sold. This can be conducted automatically, via communication between auction server 12 and MVA server 16, or by telephone or any other suitable means of processing the information.

If the ownership is valid (step 48), then the decision of whether to proceed with an electronic auction or a non-computerized auction is made at step 52. If the ownership is not valid, then an error message is sent to the seller (if computerized), and the process ends. If the auction is electronic (i.e., online), then the seller's information, including identification, details on the license plate, etc., is collected at 54 and stored on the auction server 12. At step 56, the auction is established online, preferably in the form of generating an online auction web page, and at step 58 the electronic bid repository is established and bidding is opened.

If the auction is non-computerized, then the seller information and scheduling data is collected at step 60 and is posted at step 62. The live auction bidder registration repository is established at 64, and registration for the live auction is opened.

The flow continues on FIG. 3B where, at step 66, bidding occurs and the highest bidder and the seller finalize the auction. If the auction is electronic (step 68), then the auction winner is automatically selected from the bids placed on the auction (with the winning bid being the greatest) at 70, and the purchaser is contacted automatically at 72. If the auction is live (i.e., non-computerized), then the purchase information is obtained from the winner of the auction live at 74. Payment is established at 76, and purchase is posted as being "pending" (listed as a pending payment online for electronic auctions) at 78.

Following acceptance of payment, the ownership of the license plate is transferred, including changes in the appropriate records in license plate registration database 18, at step 80. The changes to the records can take place automatically via communication between auction server 12 and MVA server 16. At this time, the sales tax, based upon the purchase price, is calculated, via communication with state sales tax server 22, and the sales tax is paid by the purchaser at step 82. The market value of the license plate is now updated to the value of sale, and this change is made in the records stored in the market value database 14 at step 84. The auction is then closed at step 86.

Following a similar process for the buyer, In FIG. 4A, the purchase is initiated at step 88, which involves accessing the system and posting a bid for the license plate at step 90. Step 90 either encompasses placing a bid on the auction server 12, with the auction being conducted via computer network, or bidding at a live, non-computerized auction. At step 92, the identification and driving credentials of the bidder are collected, confirming that the bidder is eligible to own and drive a car within the state, and this confirmation is provided via communication with the MVA server 16 at step 94. This can be conducted automatically, via communication between auction server 12 and MVA server 16, or by telephone or any other suitable means of processing the information.

If the bidder's eligibility is valid (step 96), then the decision of whether to proceed with an electronic auction or a non-computerized auction is made at step 100. If the bidder is not eligible to own or drive a motor vehicle within the state, then an error message is sent to the bidder (if computerized), and the process ends at step 98. If the auction is electronic (i.e., online), then the bidder's information, including identification and the bidder's opening bid, is collected at 102 and stored on the auction server 12. At step 104, the bid is stored in memory on the auction server 12 and posted online, preferably posted on a publicly available auction web page.

If the auction is non-computerized, then the seller information and bid are collected at step 106 and a reservation is scheduled for the live auction at step 108. The flow continues on FIG. 4B where, at step 66, bidding occurs and the highest bidder and the seller finalize the auction (it should be noted that this is the same step 66 from FIG. 3B). If the auction is electronic (step 68), then the auction winner is automatically selected from the bids placed on the auction (with the winning bid being the greatest) at 70 (FIG. 3B), and the purchaser is contacted automatically at 72 (FIG. 3B). The current market value (updated, based upon the winning bid) is displayed online at step 110. If the auction is live (i.e., non-computerized), then the purchase information is obtained from the winner of the auction live at 74. Payment is established at 76, and purchase is posted as being "pending" (listed as a pending payment online for electronic auctions) at 78 (FIG. 3B).

Following acceptance of payment, the ownership of the license plate is transferred, including changes in the appropriate records in license plate registration database 18, at step 80. The changes to the records can take place automatically via communication between auction server 12 and MVA server 16. At this time, the sales tax, based upon the purchase price, is calculated, via communication with state sales tax server 22, and the sales tax is paid by the purchaser at step 82. The market value of the license plate is now updated to the value of sale, and this change is made in the records stored in the market value database 14 at step 84. The auction is then closed at step 86. The property taxes on the transferred license plate are based upon the updated market value; i.e., the winning bid amount. The property tax assessor server 20 calculates the local property taxes owed by the new owner of the license plate based upon this amount.

In the above, the auction may be conducted, accessed and displayed in any suitable manner. Online auctions are well known in the art, and the license plate auction may be conducted via conventional online auction. Such online auctions typically include user-friendly features, allowing for the establishment of auctions and auction pages, the monitoring of ongoing, online auctions, verification of user information, the automatic payment and finalization of sales, the collection of user information, and automatic login and logout procedures. Such features are taught by U.S. Pat. Nos. 6,058,417; 6,466,917; 7,007,076; and 7,162,446, each of which is hereby incorporated by reference in its entirety.

Additionally, in the above process, when a license plate is posted by a seller for auction, the records of the market value database 14 are accessed, with a first check being made for the license plate within the records. The classification and sub-range (see Table 1) for the license plate are checked within database 14 and confirmed. If the license plate is not already recorded within the market value database 14, a new entry in the database is recorded, with the market value being set based upon the state-defined rules for the letter/number combinations, the range and sub-range of the license plate.

As an additional incentive for both governments and citizens to adopt the above method, a lottery or drawing may be established. In exchange for a minimal property tax payment of $10.00, for example, for the minimally listed market value of $1,000.00 (from the example of Table 1), a drawing may be run by the state or local government, awarding a monthly winner with a prize, such as $10,000, for example. The license plate owner may choose not to participate in this drawing, and may optionally have the $10.00 credited towards vehicle registration or state or local taxes.

In the above implementation, all transfers of license plates will take place via the above method. Alternatively, a familial exception may be made, in which immediate family may bypass the bidding process. In the above, the "ownership" of the license plate has been described with reference to the seller and buyer. It should be understood that, dependent upon state laws, the ownership of the license plate may be retained by the state, with the above method applying to the transfer of possession and the legal right to use the license plate. Further, the transfer of ownership or legal possession takes place at the MVA following state-specified rules and regulations, including the filling out of any necessary forms.

It should be understood that the above method is not directed solely to the auctioning of license plates, but to the establishment of a state registration system for the license plates in which market values for license plates are set (or changed) and, more importantly, through which both sales taxes can be levied on the transfer of the license plates (thus incurring increased revenue for the state) and property taxes can be assessed on the license plates (thus incurring increased revenue for the local government). Additionally, it should be emphasized that the above method allows for the auctioning or transfer of registered, or active, license plates, as opposed to prior known transfer of expired license plates.

It is to be understood that the present invention is not limited to the embodiments described above, but encompasses any and all embodiments within the scope of the following claims.

I claim:

1. A method for the valuation of a registered license plate to generate tax revenue under the auspices of a governmental entity, comprising the steps of:
    establishing a market value data set for a plurality of license plates, wherein a market value is created for each of the plurality of license plates by the governmental entity initially and re-assessed periodically upon the occurrence of specified events, wherein the market value is based at least on the numeric and or alphanumeric frequency and sequence of the license plate;
    storing the market value data set in a market value database recorded in computer readable memory of the governmental entity server;
    establishing a transference mechanism for at least one license plate to be sold or traded;
    establishing an initial price for the at least one license plate to be sold or traded based upon at least one respective market value of the market value data set;
    selling or trading the at least one license plate using the transference mechanism and calculating at least one annual sales tax value associated with the sale or trade of the at least one license plate, wherein the sale or trade constitutes a specified event;
    establishing an annual property tax value associated with the at least one license plate, wherein the annual property tax value is set by the governmental entity initially and re-assessed periodically upon the occurrence of specified events; and
    recording ownership of the at least one license plate in a motor vehicle administration database.

2. The method for the valuation of a registered license plate as recited in claim 1, wherein the transference mechanism is an online auction.

3. The method for the valuation of a registered license plate as recited in claim 1, wherein the transference mechanism is by sealed bids.

4. The method for the valuation of a registered license plate as recited in claim 1, wherein the transference mechanism is by public auction.

5. The method for the valuation of a registered license plate as recited in claim 1, further comprising the step of the governmental entity providing an incentive for registered license plate owners to participate in the transference.

6. The method for the valuation of a registered license plate as recited in claim 5, wherein the incentive is a monetary prize.

7. The method for the valuation of a registered license plate as recited in claim 6, wherein the monetary prize is awarded to the winner of a license plate lottery.

8. The method for the valuation of a registered license plate as recited in claim 7, wherein the license plate lottery is an online lottery.

* * * * *